United States Patent
Norrie et al.

(10) Patent No.: US 10,990,494 B2
(45) Date of Patent: Apr. 27, 2021

(54) DISTRIBUTED HARDWARE TRACING

(71) Applicant: Google LLC, Mountain View, CA (US)

(72) Inventors: Thomas Norrie, Mountain View, CA (US); Naveen Kumar, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/665,355

(22) Filed: Oct. 28, 2019

(65) Prior Publication Data

US 2020/0065206 A1    Feb. 27, 2020

Related U.S. Application Data

(63) Continuation of application No. 16/411,569, filed on May 14, 2019, which is a continuation of application
(Continued)

(51) Int. Cl.
*G06F 11/30* (2006.01)
*G06F 16/48* (2019.01)
(Continued)

(52) U.S. Cl.
CPC ............ *G06F 11/302* (2013.01); *G06F 9/542* (2013.01); *G06F 11/3072* (2013.01);
(Continued)

(58) Field of Classification Search
CPC ... H04L 41/069; H04L 43/0811; H04L 67/10; G06F 11/3466; G06F 11/2242;
(Continued)

(56) References Cited

U.S. PATENT DOCUMENTS 4,598,364 A     7/1986   Gum et al.
5,682,328 A  *  10/1997  Roeber .............. G06F 11/3476
                                                    702/187
(Continued)

FOREIGN PATENT DOCUMENTS

CN          1561493         1/2005
CN        106033385        10/2016
(Continued)

OTHER PUBLICATIONS

'www.processors.wiki.ti.com' [online] "Real-Time Hardware Trace and Analysis," last update date: Jun. 17, 2013, [retrieved on Dec. 13, 2016] Retrieved from Internet: URL<http://processors.wiki.ti.com/index.php/Real-Time_Hardware_Trace_and_Analysis> 3 pages.
(Continued)

*Primary Examiner* — David R Lazaro
(74) *Attorney, Agent, or Firm* — Fish & Richardson P.C.

(57) ABSTRACT

A computer-implemented method executed by one or more processors, the method includes monitoring execution of program code executed by a first processor component; and monitoring execution of program code executed by a second processor component. A computing system stores data identifying hardware events in a memory buffer. The stored events occur across processor units that include at least the first and second processor components. The hardware events each include an event time stamp and metadata characterizing the event. The system generates a data structure identifying the hardware events. The data structure arranges the events in a time ordered sequence and associates events with at least the first or second processor components. The system stores the data structure in a memory bank of a host device and uses the data structure to analyze performance of the program code executed by the first or second processor components.

20 Claims, 5 Drawing Sheets

Related U.S. Application Data

No. 15/875,160, filed on Jan. 19, 2018, now Pat. No. 10,324,817, which is a continuation of application No. 15/473,101, filed on Mar. 29, 2017, now Pat. No. 9,875,167.

(51) Int. Cl.
*G06F 11/34* (2006.01)
*G06F 9/54* (2006.01)
*G06F 11/36* (2006.01)

(52) U.S. Cl.
CPC ...... *G06F 11/3075* (2013.01); *G06F 11/3476* (2013.01); *G06F 11/3495* (2013.01); *G06F 11/3636* (2013.01); *G06F 16/489* (2019.01); *G06F 2201/86* (2013.01); *G06F 2201/865* (2013.01)

(58) Field of Classification Search
CPC .. G06F 11/3024; G06F 11/3065; G06F 11/34; G06F 17/30044; G06F 2201/835
See application file for complete search history.

(56) References Cited

U.S. PATENT DOCUMENTS

| | | | |
|---|---|---|---|
| 5,796,939 A | 8/1998 | Berc et al. | |
| 6,098,169 A * | 8/2000 | Ranganathan | G06F 11/3466 702/182 |
| 6,128,415 A | 10/2000 | Hultgren, III et al. | |
| 6,134,676 A | 10/2000 | Vanhuben et al. | |
| 6,189,140 B1 * | 2/2001 | Madduri | G06F 11/348 712/227 |
| 6,233,531 B1 * | 5/2001 | Klassen | G06F 11/3466 702/180 |
| 6,256,775 B1 * | 7/2001 | Flynn | G06F 9/3851 712/E9.053 |
| 6,353,924 B1 | 3/2002 | Ayers | |
| 6,530,076 B1 * | 3/2003 | Ryan | G06F 11/28 712/227 |
| 6,769,054 B1 * | 7/2004 | Sahin | G06F 11/3466 711/162 |
| 6,789,182 B1 * | 9/2004 | Brothers | G06F 11/3476 712/227 |
| 7,080,283 B1 * | 7/2006 | Songer | G06F 11/3636 714/30 |
| 8,713,370 B2 | 4/2014 | Millet et al. | |
| 8,762,951 B1 | 6/2014 | Kosche et al. | |
| 9,038,070 B2 * | 5/2015 | Lippett | G06F 11/0724 718/100 |
| 9,237,082 B2 | 1/2016 | Ziegler | |
| 9,710,265 B1 | 7/2017 | Temam | |
| 9,836,691 B1 | 12/2017 | Narayanaswami | |
| 9,858,167 B2 * | 1/2018 | Neiger | G06F 9/455 |
| 9,875,167 B1 * | 1/2018 | Norrie | G06F 16/489 |
| 10,324,817 B2 * | 6/2019 | Norrie | G06F 11/261 |
| 10,365,987 B2 | 7/2019 | Norrie et al. | |
| 10,409,709 B2 * | 9/2019 | Wang | G06F 11/2242 |
| 2002/0120815 A1 * | 8/2002 | Zahavi | G06F 11/3072 711/118 |
| 2005/0144532 A1 | 1/2005 | Dombrowa et al. | |
| 2006/0005083 A1 | 1/2006 | Genden et al. | |
| 2006/0069938 A1 * | 3/2006 | Olszewski | G06F 11/3409 713/340 |
| 2006/0168124 A1 * | 7/2006 | Battagin | G06F 16/957 709/219 |
| 2008/0235700 A1 * | 9/2008 | Iguchi | G06F 9/5077 718/104 |
| 2010/0083237 A1 | 4/2010 | Kneebone et al. | |
| 2010/0106678 A1 | 4/2010 | Pietrek et al. | |
| 2010/0251160 A1 * | 9/2010 | Shafi | G06F 11/3466 715/772 |
| 2010/0332909 A1 | 12/2010 | Larson | |
| 2011/0047358 A1 | 2/2011 | Eichenberger et al. | |
| 2011/0219376 A1 | 9/2011 | Williams et al. | |
| 2011/0246521 A1 | 10/2011 | Luo et al. | |
| 2011/0289302 A1 | 11/2011 | Ubukata et al. | |
| 2011/0289357 A1 | 11/2011 | Shiina | |
| 2011/0302560 A1 * | 12/2011 | Nadbath | G06F 11/2242 717/128 |
| 2011/0314342 A1 | 12/2011 | Gilkerson et al. | |
| 2012/0042212 A1 * | 2/2012 | Laurenti | G06F 11/3466 714/45 |
| 2012/0095728 A1 | 4/2012 | Ubukata | |
| 2012/0179898 A1 | 7/2012 | Betouin et al. | |
| 2012/0226837 A1 | 9/2012 | Cruickshank et al. | |
| 2012/0226839 A1 * | 9/2012 | Fuoco | G06F 11/348 710/110 |
| 2012/0272011 A1 * | 10/2012 | Carrie | G06F 11/3466 711/146 |
| 2012/0324290 A1 | 12/2012 | Chen | |
| 2013/0042155 A1 | 2/2013 | Millet et al. | |
| 2013/0250777 A1 | 9/2013 | Ziegler | |
| 2015/0113228 A1 * | 4/2015 | Huang | G06F 11/34 711/143 |
| 2016/0070636 A1 * | 3/2016 | Furtwangler | G06F 8/437 717/126 |
| 2016/0378636 A1 * | 12/2016 | Strong | G06F 11/3466 714/45 |
| 2017/0177460 A1 * | 6/2017 | Neiger | G06F 11/3466 |
| 2017/0371761 A1 | 12/2017 | Piga et al. | |
| 2017/0371769 A1 * | 12/2017 | Merten | G06F 9/45558 |
| 2018/0121517 A1 * | 5/2018 | Barsness | G06F 11/3409 |
| 2018/0285226 A1 * | 10/2018 | Norrie | G06F 9/542 |
| 2018/0285233 A1 * | 10/2018 | Norrie | G06F 9/542 |
| 2018/0357118 A1 * | 12/2018 | Jang | G06F 11/0724 |

FOREIGN PATENT DOCUMENTS

| | | |
|---|---|---|
| JP | H05128079 | 5/1993 |
| TW | 201640422 A | 11/2016 |
| TW | 201706842 | 2/2017 |

OTHER PUBLICATIONS

'www.software.intel.com' [online] "Processor Tracing," Sep. 18, 2013 [retrieved on Dec. 2, 2016] Retrieved from Internet: URL<https://software.intel.com/en-us/blogs/2013/09/18/processor-tracing> 4 pages.

'www.software.intel.com' [online] "Hardware Event-based Sampling Collection," Last updated date unavailable [retrieved on Dec. 2, 2016] Retrieved from Internet: URL<https://software.intel.com/en-us/node/544067> 3 pages.

'www.thenewstack.io' [online] "Hardware Tracing for Fast and Precise Performance Analysis," Oct. 12, 2015, [retrieved on Dec. 2, 2016] Retrieved from Internet: URL<https://thenewstack.io/hardware-tracing-fast-precise-performance-analysis/> 7 pages.

Extended European Search Report issued in European Application No. 17199337.1, dated Feb. 26, 2018, 8 pages.

Extended European Search Report issued in European Application No. 17199338.9, dated Jun. 26, 2018, 14 pages.

International Preliminary Report on Patentability issued in international Application No. PCT/US2017/057619, dated Feb. 20, 2019, 22 pages.

International Search Report and Written Opinion issued in International Application No. PCT/US2017/057619, dated Feb. 21, 2018, 13 pages.

International Search Report and Written Opinion issued in International Application No. PCT/US2017/057638, dated Apr. 26, 2018, 18 pages.

Invite to Pay Additional Fees and, Where Applicable, Protest Fee, with Partial Search Report, issued in International Application No. PCT/US2017/057638, dated Mar. 1, 2018, 13 pages.

Lamport. "Time, Clocks, and the Ordering of Events in a Distributed System," Communications of the ACM 21.7, Jul. 1, 1978, 8 pages.

Li et al. "Template-based Memory Access Engine for Accelerators in SoCs," Proceedings of the 16th Asia and South Pacific Design Automation Conference IEEE Press, Jan. 25, 2011, 7 pages.

(56) References Cited

OTHER PUBLICATIONS

Office Action issued in British Application No. GB1717923.5, dated Apr. 10, 2018, 6 pages.
Office Action issued in British Application No. GB1717925.0, dated Apr. 18, 2018, 7 pages.
Office Action issued in Chinese Application No. 201721706223.5, dated May 11, 2018, 3 pages (with English Translation).
Office Action issued in Chinese Application No. 201721704657.x dated May 17, 2018, 5 pages (with English Translation).
Partial Search Report issued in European Application No. 17199338.9, dated Feb. 28, 2018, 13 pages.
Sigelman et al. "Dapper, a Large-Scale Distributed Systems Tracing Infrastructure," Google Technical Report dapper-2010-1, Apr. 2010, 14 pages.
Office Action issued in Taiwanese Application No. 106137500, dated Oct. 4, 2018, 12 pages (with English translation).
Office Action issued in Taiwanese Application No. 106137283, dated Oct. 16, 2018, 14 pages (with English translation).
PCT International Preliminary Report on Patentability in International Application No. PCT/US2017/057638, dated Oct. 10, 2019, 10 pages.
GB Office Action in Great Britain Application No. GB1717925, dated Mar. 30, 2020, 4 pages.
CN Office Action in Chinese Application No. 201711294123, dated Jan. 18, 2021, 19 pages (with English translation).

\* cited by examiner

500

```
┌─────────────────────────────────────────────────────────────────┐
│ COMPUTING SYSTEM MONITORS EXECUTION OF PROGRAM CODE BY A FIRST  │
│  PROCESSOR COMPONENT THAT EXECUTES AT LEAST A FIRST PORTION OF  │
│                      THE PROGRAM CODE                       502 │
└─────────────────────────────────────────────────────────────────┘
                                 ▼
┌─────────────────────────────────────────────────────────────────┐
│  COMPUTING SYSTEM MONITORS EXECUTION OF THE PROGRAM CODE BY A   │
│  SECOND PROCESSOR COMPONENT THAT EXECUTES AT LEAST A SECOND     │
│                 PORTION OF THE PROGRAM CODE                 504 │
└─────────────────────────────────────────────────────────────────┘
                                 ▼
┌─────────────────────────────────────────────────────────────────┐
│    COMPUTING SYSTEM STORES DATA IDENTIFYING HARDWARE EVENTS     │
│     OCCURRING ACROSS PROCESSOR UNITS THAT INCLUDE THE FIRST AND │
│  SECOND PROCESSOR COMPONENTS, THE DATA IDENTIFYING THE HARDWARE │
│       EVENTS INCLUDES A HARDWARE EVENT TIME STAMP AND METADATA  │
│           CHARACTERIZING THE HARDWARE EVENT                 506 │
└─────────────────────────────────────────────────────────────────┘
                                 ▼
┌─────────────────────────────────────────────────────────────────┐
│ COMPUTING SYSTEM GENERATES A DATA STRUCTURE THAT IDENTIFIES THE │
│   HARDWARE EVENTS AND THAT ARRANGES THE HARDWARE EVENTS IN A    │
│  TIME ORDERED SEQUENCE OF EVENTS THAT ARE ASSOCIATED WITH AT    │
│     LEAST THE FIRST OR SECOND PROCESSOR COMPONENTS          508 │
└─────────────────────────────────────────────────────────────────┘
                                 ▼
┌─────────────────────────────────────────────────────────────────┐
│ COMPUTING SYSTEM STORES THE DATA STRUCTURE IN HOST DEVICE MEMORY│
│    AND USES THE DATA STRUCTURE TO ANALYZE PERFORMANCE OF THE    │
│  PROGRAM CODE EXECUTED BY AT LEAST THE FIRST AND SECOND         │
│              PROCESSOR COMPONENTS                           510 │
└─────────────────────────────────────────────────────────────────┘
```

FIG. 5

DISTRIBUTED HARDWARE TRACING

CROSS-REFERENCE TO RELATED APPLICATION

This application is a continuation of U.S. patent application Ser. No. 16/411,569, entitled "Distributed Hardware Tracing," filed on May 14, 2019, which is a continuation of U.S. patent application Ser. No. 15/875,160, entitled "Distributed Hardware Tracing," filed Jan. 19, 2018, which is a continuation of U.S. patent application Ser. No. 15/473,101, entitled "Distributed Hardware Tracing," filed Mar. 29, 2017, the contents of each are incorporated by reference herein in its entirety.

This application is related to U.S. patent application Ser. No. 15/472,932, entitled "Synchronous Hardware Event Collection," filed on Mar. 29, 2017. The entire disclosure of U.S. patent application Ser. No. 15/472,932 is expressly incorporated by reference herein in its entirety.

BACKGROUND

This specification relates to analyzing execution of program code.

Effective performance analysis of distributed software executing within distributed hardware components can be a complex task. Distributed hardware components can be respective processor cores of two or more Central Processing Units (CPUs) (or Graphics Processing Units (GPUs)) that cooperate and interact to execute portions of a larger software program or program code.

From the hardware perspective (e.g., within the CPUs or GPUs), there are generally two types of information or features available for performance analysis: 1) hardware performance counters and 2) hardware event traces.

SUMMARY

In general, one aspect of the subject matter described in this specification can be embodied in a computer-implemented method executed by one or more processors. The method includes, monitoring execution of program code by a first processor component, the first processor component being configured to execute at least a first portion of the program code; and monitoring execution of the program code by a second processor component, the second processor component being configured to execute at least a second portion of the program code.

The method further includes, storing, by the computing system and in at least one memory buffer, data identifying one or more hardware events occurring across processor units that include the first processor component and the second processor component. Each hardware event represents at least one of data communications associated with a memory access operation of the program code, an issued instruction of the program code, or an executed instruction of the program code. The data identifying each of the one or more hardware events includes a hardware event time stamp and metadata characterizing the hardware event. The method includes, generating, by the computing system, a data structure that identifies the one or more hardware events, the data structure being configured to arrange the one or more hardware events in a time ordered sequence of events that are associated with at least the first processor component and the second processor component.

The method further includes, storing, by the computing system, the generated data structure in a memory bank of a host device for use in analyzing performance of the program code being executed by at least the first processor component or the second processor component.

These and other implementations can each optionally include one or more of the following features. For example, in some implementations, the method further includes: detecting, by the computing system, a trigger function associated with portions of program code being executed by at least one of the first processor component or the second processor component; and responsive to detecting the trigger function, initiating, by the computing system, at least one trace event that causes data associated with the one or more hardware events to be stored in the at least one memory buffer.

In some implementations, the trigger function corresponds to at least one of a particular sequence step in the program code or a particular time parameter indicated by a global time clock used by the processor units; and initiating the at least one trace event includes determining that a trace bit is set to a particular value, the at least one trace event being associated with a memory access operation including multiple intermediate operations that occur across the processor units, and data associated with the multiple intermediate operations is stored in one or more memory buffers in response to determining that the trace bit is set to the particular value.

In some implementations, storing data identifying the one or more hardware events further includes: storing, in a first memory buffer of the first processor component, a first subset of data identifying hardware events of the one or more hardware events. The storing occurs in response to the first processor component executing a hardware trace instruction associated with at least the first portion of the program code.

In some implementations, storing data identifying the one or more hardware events further includes: storing, in a second memory buffer of the second processor component, a second subset of data identifying hardware events of the one or more of hardware events. The storing occurs in response to the second processor component executing a hardware trace instruction associated with at least the second portion of the program code.

In some implementations, generating the data structure further includes: comparing, by the computing system, at least hardware event time stamps of respective events in the first subset of data identifying hardware events with at least hardware event time stamps of respective events in the second subset of data identifying hardware events; and providing, by the computing system and for presentation in the data structure, a correlated set of hardware events based, in part, on the comparison between the respective events in the first subset and the respective events in the second subset.

In some implementations, the generated data structure identifies at least one parameter that indicates a latency attribute of a particular hardware event, the latency attribute indicating at least a duration of the particular hardware event. In some implementations, at least one processor of the computing system is a multi-core multi-node processor having one or more processor components, and the one or more hardware events correspond, in part, to data transfers that occur between at least the first processor component of a first node and the second processor component of a second node.

In some implementations, the first processor component and the second processor component is one of: a processor, a processor core, a memory access engine, or a hardware feature of the computing system, and the one or more hardware events correspond, in part, to movement of data packets between a source and a destination; and metadata characterizing the hardware event corresponds to at least one of a source memory address, a destination memory address, a unique trace identification number, or a size parameter associated with a direct memory access (DMA) trace.

In some implementations, a particular trace (ID) number is associated with multiple hardware events that occur across the processor units, and wherein the multiple hardware events correspond to a particular memory access operation, and the particular trace ID number is used to correlate one or more hardware events of the multiple hardware events and is used for determining a latency attribute of the memory access operation based on the correlation.

Another aspect of the subject matter described in this specification can be embodied in a distributed hardware tracing system, including: one or more processors including one or more processor cores; one or more machine-readable storage units for storing instructions that are executable by the one or more processors to perform operations including: monitoring execution of program code by a first processor component, the first processor component being configured to execute at least a first portion of the program code; and monitoring execution of the program code by a second processor component, the second processor component being configured to execute at least a second portion of the program code.

The method further includes, storing, by the computing system and in at least one memory buffer, data identifying one or more hardware events occurring across processor units that include the first processor component and the second processor component. Each hardware event represents at least one of data communications associated with a memory access operation of the program code, an issued instruction of the program code, or an executed instruction of the program code. The data identifying each of the one or more hardware events includes a hardware event time stamp and metadata characterizing the hardware event. The method includes, generating, by the computing system, a data structure that identifies the one or more hardware events, the data structure being configured to arrange the one or more hardware events in a time ordered sequence of events that are associated with at least the first processor component and the second processor component.

The method further includes, storing, by the computing system, the generated data structure in a memory bank of a host device for use in analyzing performance of the program code being executed by at least the first processor component or the second processor component.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The subject matter described in this specification can be implemented in particular embodiments so as to realize one or more of the following advantages. The described hardware tracing systems enable efficient correlation of hardware events that occur during execution of a distributed software program by distributed processing units including multi-node multi-core processors. The described hardware tracing system further includes mechanisms that enable collection and correlation of hardware events/trace data in multiple cross-node configurations.

The hardware tracing system enhances computational efficiency by using dynamic triggers that execute through hardware knobs/features. Further, hardware events can be time-ordered in a sequenced manner with event descriptors such as unique trace identifiers, event timestamps, event source-address, and event destination-address. Such descriptors aid software programmers and processor design engineers with effective debugging and analysis of software and hardware performance issues that may arise during source code execution.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIG. 5 is a process flow diagram of an example process for distributed hardware tracing.

Like reference numbers and designations in the various drawings indicate like elements.

DETAILED DESCRIPTION

The subject matter described in this specification generally relates to distributed hardware tracing. In particular, a computing system monitors execution of program code executed by one or more processor cores. For example, the computing system can monitor execution of program code executed by a first processor core and execution of program code executed by at least a second processor core. The computing system stores data identifying one or more hardware events in a memory buffer. The stored data identifying the events correspond to events that occur across distributed processor units that include at least the first and second processor cores.

For each hardware event, the stored data includes an event time stamp and metadata characterizing the hardware event. The system generates a data structure identifying the hardware events. The data structure arranges the events in a time ordered sequence and associates events with at least the first or second processor cores. The system stores the data structure in a memory bank of a host device and uses the data structure to analyze performance of the program code executed by the first or second processor cores.

Figure 1:
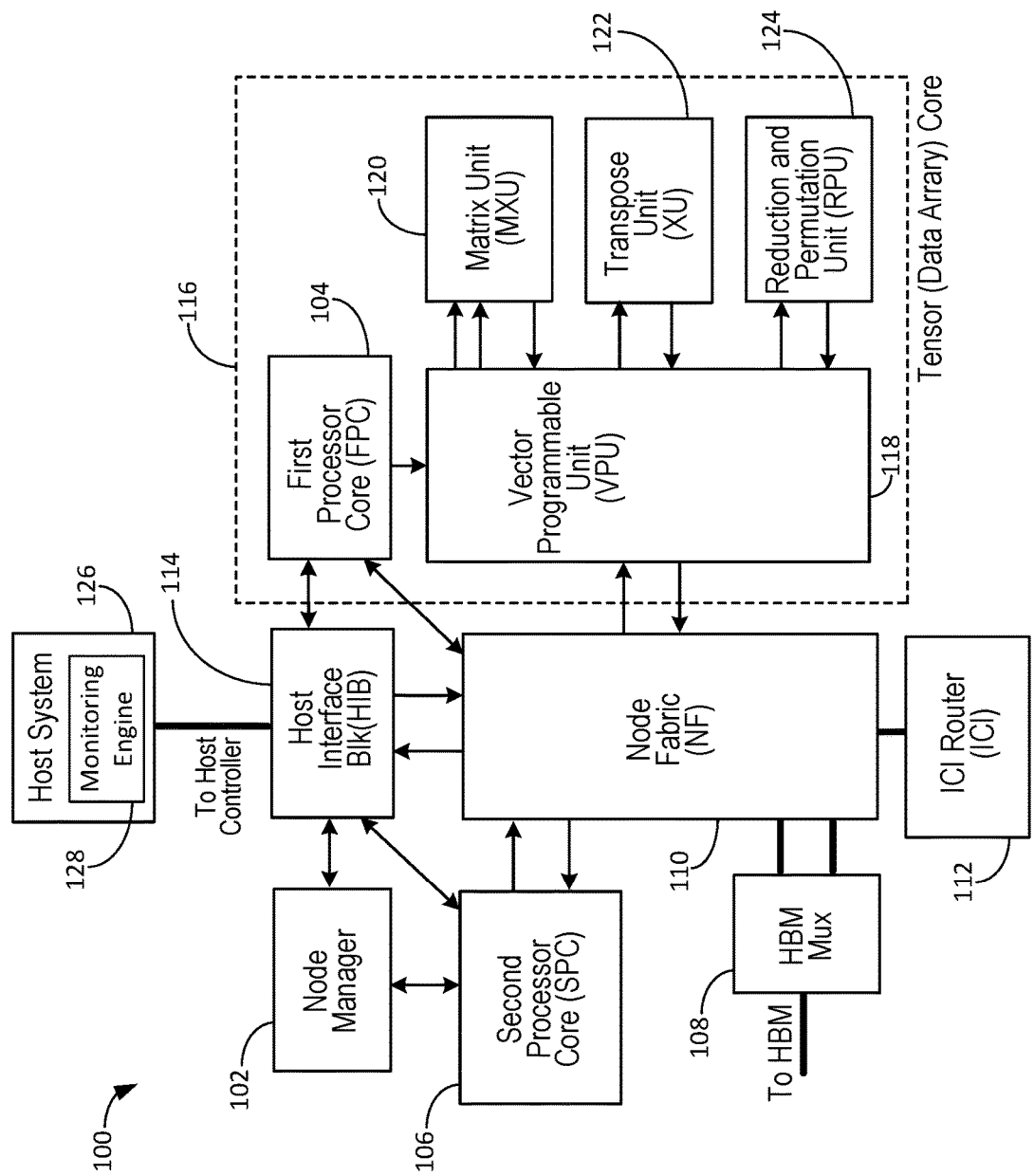
FIG. 1 illustrates a block diagram of an example computing system for distributed hardware tracing.

FIG. 1 illustrates a block diagram of an example computing system 100 for distributed hardware tracing. As used in this specification, distributed hardware system tracing corresponds to storage of data identifying events that occur within components and sub-components of an example processor micro-chip. Further, as used herein, a distributed hardware system (or tracing system) corresponds to a collection of processor micro-chips or processing units that cooperate to execute respective portions of a software/program code configured for distributed execution amongst the collection of processor micro-chips or distributed processing units.

System 100 can be a distributed processing system, having one or more processors or processing units that execute a software program in a distributed manner, i.e., by executing different parts or portions of the program code on different processing units of system 100. Processing units can include two or more processors, processor micro-chips, or processing units, e.g., at least a first processing unit and a second processing unit.

In some implementations, two or more processing units can be distributed processing units when the first processing unit receives and executes a first portion of program code of a distributed software program, and when the second processing unit receives and executes a second portion of program code of the same distributed software program.

In some implementations, different processor chips of system 100 can form respective nodes of the distributed hardware system. In alternative implementations, a single processor chip can include one or more processor cores and hardware features that can each form respective nodes of the processor chip.

For example, in the context of a central processing unit (CPU), a processor chip can include at least two nodes and each node can be a respective core of the CPU. Alternatively, in the context of a graphical processor unit (GPU), a processor chip can include at least two nodes and each node can be a respective streaming multiprocessor of the GPU. Computing system 100 can include multiple processor components. In some implementations, the processor components can be at least one of a processor chip, a processor core, a memory access engine, or at least one hardware component of the overall computing system 100.

In some instances, a processor component, such as a processor core, can be a fixed-function component configured to execute at least one specific operation based on at least one issued instruction of the executing program code. In other instances, a processor component, such as a memory access engine (MAE), can be configured to execute program code at a lower level of detail or granularity than program code executed by other processor components of system 100.

For example, program code executed by a processor core can cause an MAE descriptor to be generated and transmitted/sent to the MAE. After receipt of the descriptor, the MAE can execute a data transfer operation based on the MAE descriptor. In some implementations, data transfers executed by the MAE can include, for example, moving data to and from certain components of system 100 via certain data paths or interface components of the system, or issuing data requests onto an example configuration bus of system 100.

In some implementations, each tensor node of an example processor chip of system 100 can have at least two "front-ends" which can be hardware blocks/features that process program instructions. As discussed in more detail below, a first front-end can correspond to first processor core 104, while a second front-end can correspond to second processor core 106. Hence, the first and second processor cores may also be described herein as first front-end 104 and second front-end 106.

As used in this specification, a trace chain can be a specific physical data communication bus that trace entries can be put onto for transmission to an example chip manager within system 100. Received trace entries can be data words/structures including multiple bytes and multiple binary values or digits. Thus, the descriptor "word" indicates a fixed-sized piece of binary data that can be handled as a unit by hardware devices of an example processor core.

In some implementations, the processor chips of the distributed hardware tracing system are multi-core processors (i.e., having multiple cores) that each execute portions of program code in respective cores of the chip. In some implementations, portions of program code can correspond to vectorized computations for inference workloads of an example multi-layer neural network. While in alternative implementations, portions of program code can correspond generally to software modules associated with conventional programming languages.

Computing system 100 generally includes a node manager 102, a first processor core (FPC) 104, a second processor core (SPC) 106, a node fabric (NF) 110, a data router 112, and a host interface block (HIB) 114. In some implementations, system 100 can include a memory mux 108 that is configured to perform signal switching, multiplexing, and de-multiplexing functions. System 100 further includes a tensor core 116 that includes FPC 104 disposed therein. Tensor core 116 can be an example computational device configured to perform vectorized computations on multi-dimensional data arrays. Tensor core 116 can include a vector processing unit (VPU) 118, that interacts with a matrix unit (MXU) 120, transpose unit (XU) 122, and reduction and permutation unit (RPU) 124. In some implementations, computing system 100 can include one or more execution units of a conventional CPU or GPU, such as load/store units, arithmetic logic units (ALU's) and vector units.

The components of system 100 collectively include a large set of hardware performance counters as well as support hardware that facilitates completion of tracing activity within the components. As described in more detail below, program code executed by respective processor cores of system 100 can include embedded triggers used to simultaneously enable multiple performance counters during code execution. In general, detected triggers cause trace data to be generated for one or more trace events. The trace data can correspond to incremental parameter counts that are stored in the counters and that can be analyzed to discern performance characteristics of the program code. Data for respective trace events can be stored in an example storage medium (e.g., a hardware buffer) and can include a timestamp that is generated responsive to detection of the trigger.

Further, trace data can be generated for a variety of events occurring within hardware components of system 100. Example events can include inter-node and cross-node communication operations, such as direct memory access (DMA) operations and sync flag updates (each described in more detail below). In some implementations, system 100 can include a globally synchronous timestamp counter generally referred to as Global Time Counter ("GTC"). In other implementations, system 100 can include other types of global clocks, such as a Lamport Clock.

The GTC can be used for precise correlation of program code execution and performance of software/program code that executes in a distributed processing environment. Additionally, and related in part to the GTC, in some implementations system 100 can include one or more trigger mechanisms used by distributed software programs to start and stop data tracing in a distributed system in a highly coordinated manner.

In some implementations, a host system 126 compiles program code that can include embedded operands that trigger, upon detection, to cause capture and storage of trace data associated with hardware events. In some implementations, host system 126 provides the compiled program code to one or more processor chips of system 100. In alternative implementations, program code can be compiled (with embedded triggers) by an example external compiler and loaded to the to one or more processor chips of system 100. In some instances, the compiler can set one or more trace bits (discussed below) associated with certain triggers that are embedded in portions of software instructions. The compiled program code can be a distributed software program that is executed by the one or more components of system 100.

Host system 126 can include a monitoring engine 128 configured to monitor execution of program code by one or more components of system 100. In some implementations, monitoring engine 128 enables host system 126 to monitor execution of program code executed by at least FPC 104 and SPC 106. For example, during code execution, host system 126 can monitor, via monitoring engine 128, performance of the executing code at least by receiving periodic timelines of hardware events based on generated trace data. Although a single block is shown for host system 126, in some implementations, system 126 can include multiple hosts (or host subsystems) that are associated with multiple processor chips or chip cores of system 100.

In other implementations, cross-node communications that involve at least three processor cores may cause host system 126 to monitor data traffic at one or more intermediate "hops" as data traffic traverses a communication path between FPC 104 and an example third processor core/node. For example, FPC 104 and the third processor core may be the only cores executing program code at given time period. Hence, a data transfer from FPC 104 to the third processor core can generate trace data for an intermediate hop at SPC 106 as data is transferred from FPC 104 to the third processor core. Stated another way, during data routing in system 100, data from a first processor chip going to a third processor chip may need to traverse a second processor chip, and so execution of the data routing operation may cause trace entries to be generated for routing activity in the second chip.

Upon execution of the compiled program code, the components of system 100 can interact to generate timelines of hardware events that occur in a distributed computer system. The hardware events can include intra-node and cross-node communication events. Example nodes of a distributed hardware system and their associated communications are described in more detail below with reference to FIG. 2. In some implementations, a data structure is generated that identifies a collection of hardware events for at least one hardware event timeline. The timeline enables reconstruction of events that occur in the distributed system. In some implementations, event reconstruction can include correct event ordering based on analysis of time stamps generated during occurrence of a particular event.

In general, an example distributed hardware tracing system can include the above described components of system 100 as well as at least one host controller associated with a host system 126. Performance or debugging of data obtained from a distributed tracing system can be useful when the event data is correlated in, for example, a time-ordered or sequenced manner. In some implementations, data correlation can occur when multiple stored hardware events corresponding to connected software modules are stored and then sequenced for structured analysis by host system 126. For implementations including multiple host systems, correlation of data obtained via the different hosts may be performed, for example, by the host controller.

In some implementations, FPC 104 and SPC 106 are each distinct cores of a multi-core processor chip; while in other implementations, FPC and SPC 104, 106 are respective cores of distinct multi-core processor chips. As indicated above, system 100 can include distributed processor units having at least FPC 104 and SPC 106. In some implementations, distributed processor units of system 100 can include one or more hardware or software components configured to execute at least a portion of a larger distributed software program or program code.

Data router 112 is an inter-chip interconnect (ICI) providing data communication paths between the components of system 100. In particular, router 112 can provide communication coupling or connections between FPC 104 and SPC 106, and between the respective components associated with cores 104, 106. Node fabric 110 interacts with data router 112 to move data packets within the distributed hardware components and sub-components of system 100.

Node manager 102 is a high-level device that manages low-level node functions in multi-node processor chips. As discussed in more detail below, one or more nodes of a processor chip can include chip managers controlled by node manager 102 to manage and store hardware event data in local entry logs. Memory mux 108 is a multiplexing device that can perform switching, multiplexing, and de-multiplexing operations on data signals provided to an example external high bandwidth memory (HBM) or data signals received from the external HBM.

In some implementations, an example trace entry (described below) can be generated, by mux 108, when mux 108 switches between FPC 104 and SPC 106. Memory mux 108 can potentially impact performance of a particular processor core 104, 106 that is not able to access mux 108. Thus, trace entry data generated by mux 108 can aid in understanding resulting spikes in latencies of certain system activities associated with the respective cores 104, 106. In some implementations, hardware event data (e.g., trace points discussed below) originating within mux 108 can be grouped, in an example hardware event timeline, along with event data for node fabric 110. Event grouping can occur when certain tracing activity causes event data for multiple hardware components to be stored in an example hardware buffer (e.g., trace entry log 218, discussed below).

In system 100, performance analysis hardware encompasses FPC 104, SPC 106, mux 108, node fabric 110, data router 112, and HIB 114. Each of these hardware components or units include hardware performance counters as well as hardware event tracing facilities and functions. In some implementations, VPU 118, MXU 120, XU 122 and RPU 124 do not include their own dedicated performance hardware. Rather, in such implementations, FPC 104 can be configured to provide the necessary counters for VPU 118, MXU 120, XU 122 and RPU 124.

VPU 118 can include an internal design architecture that supports localized high bandwidth data processing and arithmetic operations associated with vector elements of an example matrix-vector processor. MXU 120 is a matrix multiplication unit configured to perform, for example, up to 128×128 matrix multiplies on vector data sets of multiplicands.

XU 122 is a transpose unit configured to perform, for example, up to 128×128 matrix transpose operations on vector data associated with the matrix multiply operations.

RPU 124 can include a sigma unit and a permute unit. The sigma unit executes sequential reductions on vector data associated with the matrix multiply operations. The reductions can include sums and various types of compare operations. The permute unit can fully permute or replicate all elements of vector data associated with the matrix multiply operations.

In some implementations, program code executed by the components of system 100 can be representative of machine learning, neural network inference computations, and/or one or more direct memory access functions. Components of system 100 can be configured to execute one or more software programs including instructions that cause a processing unit(s) or device(s) of the system to execute one or more functions. The term "component" is intended to include any data processing device or storage device such as control status registers or any other device able to process and store data.

System 100 can generally include multiple processing units or devices that can include one or more processors (e.g., microprocessors or central processing units (CPUs)), graphics processing units (GPUs), application specific integrated circuits (ASICs), or a combination of different processors. In alternative embodiments, system 100 can each include other computing resources/devices (e.g., cloud-based servers) that provide additional processing options for performing computations related to hardware tracing functions described in this specification.

The processing units or devices can further include one or more memory units or memory banks (e.g., registers/counters). In some implementations, the processing units execute programmed instructions stored in memory to devices of system 100 to perform one or more functions described in this specification. The memory units/banks can include one or more non-transitory machine-readable storage mediums. The non-transitory machine-readable storage medium can include solid-state memory, magnetic disk, and optical disk, a random access memory (RAM), a read-only memory (ROM), an erasable programmable read-only memory (e.g., EPROM, EEPROM, or Flash memory), or any other tangible medium capable of storing information.

Figure 2:
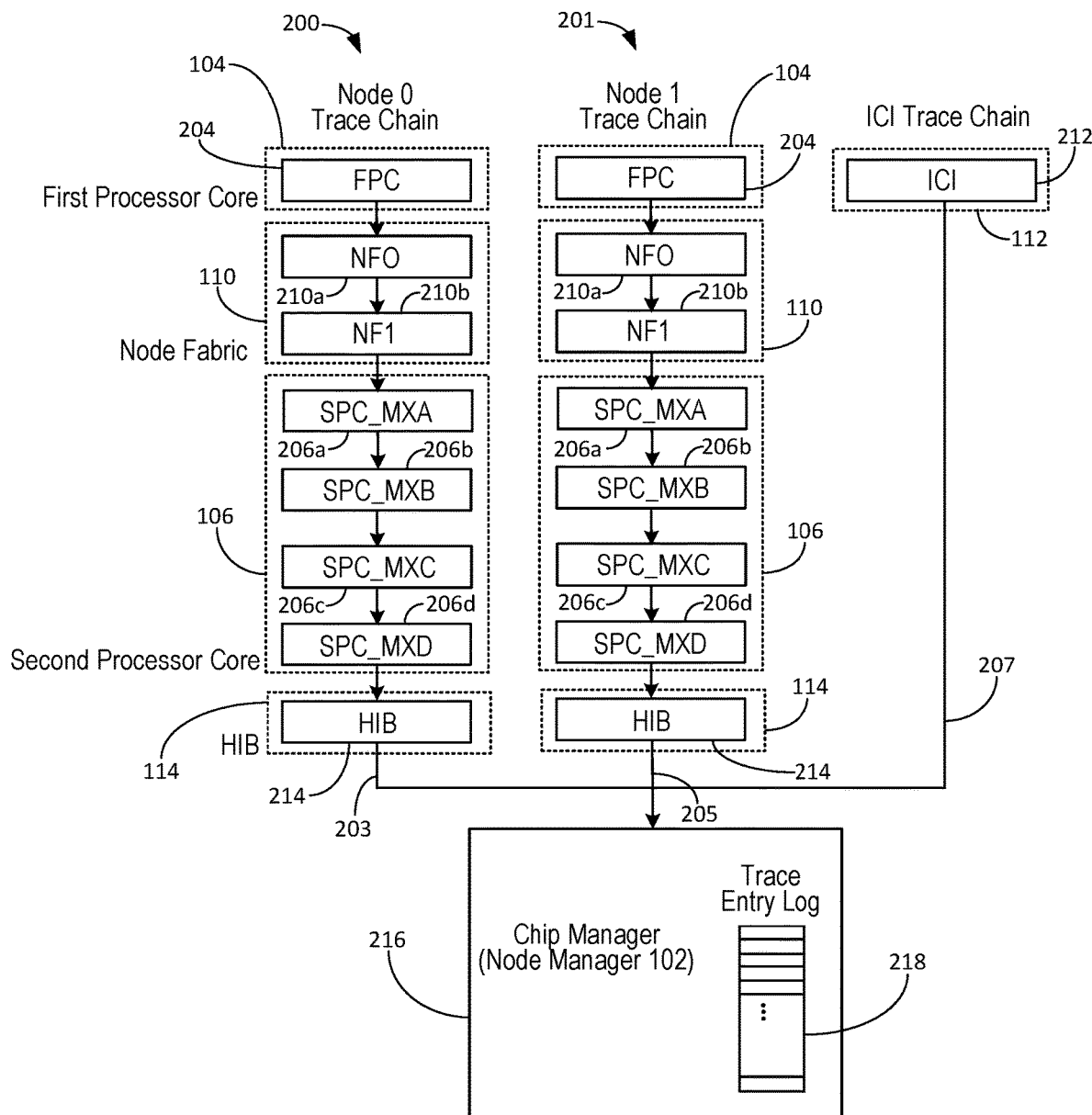
FIG. 2 illustrates a block diagram of trace chains and respective nodes of an example computing system for distributed hardware tracing.

FIG. 2 illustrates a block diagram of example trace chains and respective example nodes 200, 201 used for distributed hardware tracing executed by system 100. In some implementations, the nodes 200, 201 of system 100 can be different nodes within a single multi-core processor. In other implementations, node 200 can be a first node in a first multi-core processor chip and node 201 can be a second node in a second multi-core processor chip.

Although two nodes are depicted in the implementation of FIG. 2, in alternative implementations, system 100 can include multiple nodes. For implementations involving multiple nodes, cross-node data transfers can generate trace data at intermediate hops along an example data path that traverse multiple nodes. For example, intermediate hops can correspond to data transfers which pass through distinct nodes in a particular data transfer path. In some instances, trace data associated with ICI traces/hardware events can be generated for one or more intermediate hops that occur during cross-node data transfers which pass through one or more nodes.

In some implementations, node 0 and node 1 are tensor nodes used for vectorized computations associated with portions of program code for inference workloads. As used in this specification, a tensor is a multi-dimensional geometric object and example multi-dimensional geometric objects include matrices and data arrays.

As shown in the implementation of FIG. 2, node 200 includes a trace chain 203 that interacts with at least a subset of the components of system 100. Likewise, node 201 includes a trace chain 205 that interacts with at least a subset of the components of system 100. In some implementations, nodes 200, 201 are example nodes of the same subset of components, while in other implementations, nodes 200, 201 are respective nodes of distinct component subsets. Data router/ICI 112 includes a trace chain 207 that generally converges with trace chains 203 and 205 to provide trace data to chip manager 216.

In the implementation of FIG. 2, nodes 200, 201 can each include respective component subsets having at least FPC 104, SPC 106, node fabric 110, and HIB 114. Each component of nodes 200, 201 includes one or more trace muxes configured to group trace points (described below) generated by a particular component of the node. FPC 104 includes a trace mux 204, node fabric 110 includes trace muxes 210a/b, SPC 106 includes trace muxes 206a/b/c/d, HIB 214 includes trace mux 214, and ICI 212 includes trace mux 212. In some implementations, a trace control register for each trace mux allows individual trace points to be enabled and disabled. In some instances, for one or more trace muxes, their corresponding trace control registers can include individual enable bits as well as broader trace mux controls.

In general, the trace control registers can be conventional control status registers (CSR) that receive and store trace instruction data. Regarding the broader trace mux controls, in some implementations, tracing can be enabled and disabled based on CSR writes executed by system 100. In some implementations, tracing can be dynamically started and stopped, by system 100, based on the value of a global time counter (GTC), the value of an example trace-mark register in the FPC 104 (or core 116), or based on the value of a step mark in SPC 106.

Details and descriptions relating to computing systems and computer-implemented methods for dynamically starting and stopping tracing activity as well as for synchronized hardware event collection are described in related U.S. patent application Ser. No. 15/472,932, entitled "Synchronous Hardware Event Collection," filed on Mar. 29, 2017. The entire disclosure of U.S. patent application Ser. No. 15/472,932 is expressly incorporated by reference herein in its entirety.

In some implementations, for core 116, FPC 104 can use a trace control parameter to define a trace window associated with event activity occurring within core 116. The trace control parameter allows the trace window to be defined in terms of lower and upper bounds for the GTC as well as lower and upper bounds for the trace-mark register.

In some implementations, system 100 can include functions that enable reduction of the number of trace entries that are generated, such as trace event filtering features. For example, FPC 104 and SPC 106 can each include filtering features which limit the rate at which each core sets a trace bit in an example generated trace descriptor (described below). HIB 114 can include similar filtering features such as an example DMA rate limiter that limits trace bits associated with capture of certain DMA trace events. Additionally, HIB 114 can include controls (e.g., via an enable bit) for limiting which queues source DMA trace entries.

In some implementations, a descriptor for a DMA operation can have a trace bit that is set by an example compiler of host system 126. When the trace bit is set, hardware features/knobs that determine and generate trace data are used to complete an example trace event. In some instances, a final trace bit in the DMA can be a logical OR operation between a trace bit that is statically inserted by the compiler and a trace bit that is dynamically determined by a particular hardware component. Hence, in some instances, the compiler generated trace bit can provide a mechanism, apart from filtering, to reduce an overall amount of trace data that is generated.

For example, a compiler of host system 126 may decide to only set trace bits for one or more remote DMA operations (e.g., a DMA across at least two nodes) and clear trace bits for one or more local DMA operations (e.g., a DMA within a particular tensor node, such as node 200). In this manner, an amount of trace data that is generated can be reduced based on tracing activity being limited to cross-node (i.e., remote) DMA operations, rather than tracing activity that includes both cross-node and local DMA operations.

In some implementations, at least one trace event initiated by system 100 can be associated with a memory access operation that includes multiple intermediate operations occurring across system 100. A descriptor (e.g., an MAE descriptor) for the memory access operation can include a trace bit that causes data associated with the multiple intermediate operations to be stored in one or more memory buffers. Thus, the trace bit can be used to "tag" intermediate memory operations and generate multiple trace events at intermediate hops of the DMA operation as data packets traverse system 100.

In some implementations, ICI 112 can include a set of enable bits and a set of packet filters that provide control functionality for each ingress and egress port of a particular component of node 200, 201. These enable bits and packet filters allow ICI 112 to enable and disable trace points associated with particular components of nodes 200, 201. In addition to enabling and disabling trace points, ICI 112 can be configured to filter trace data based on event source, event destination, and trace event packet type.

In some implementations, in addition to using step markers, GTC, or trace markers, each trace control register for processor cores 104, 106 and HIB 114 can also include an "everyone" trace mode. This "everyone" trace mode can enable tracing across an entire processor chip to be controlled by either trace mux 204 or trace mux 206a. While in the everyone trace mode, traces muxes 204 and 206a can send an "in-window" trace control signal that specifies whether or not that particular trace mux, either mux 204 or mux 206a, is in a trace window.

The in-window trace control signal can be broadcast or universally transmitted to all other trace muxes, for example, within a processor chip or across multiple processor chips. The broadcast to the other trace muxes can cause all tracing to be enabled when either mux 204 or mux 206a is executing tracing activity. In some implementations, trace muxes associated with processor cores 104, 106, and HIB 114 each include a trace window control register that specifies when and/or how the "everyone trace" control signal is generated.

In some implementations, tracing activity in trace muxes 210a/b and trace mux 212, is generally enabled based on whether a trace bit is set in data words for DMA operations or control messages that traverses ICI/data router 112. DMA operations or control messages can be fixed-size binary data structures that can have a trace bit within the binary data packets set based on certain circumstances or software conditions.

For example, when a DMA operation is initiated in FPC 104 (or SPC 106) with a trace-type DMA instruction and the initiator (processor cores 104 or 106) is in a trace window, the trace bit will be set in that particular DMA. In another example, for FPC 104, control messages for data writes to another component within system 100 will have the trace bit set if FPC 104 is in a trace window and a trace point that causes trace data to be stored is enabled.

In some implementations, zero-length DMA operations provide an example of a broader DMA implementation within system 100. For example, some DMA operations can produce non-DMA activity within system 100. Execution of the non-DMA activity can also be traced (e.g., generate trace data) as if the non-DMA activity were a DMA operation (e.g., DMA activity including non-zero-length operations). For example, a DMA operation initiated at a source location but without any data (e.g., zero-length) to be sent or transferred could instead send a control message to the destination location. The control message will indicate that there is no data to be received, or worked with, at the destination, and the control message itself would be traced by system 100 as a non-zero-length DMA operation would be traced.

In some instances, for SPC 106, zero-length DMA operations can generate a control message, and a trace bit associated with the message is set only if the DMA would have had the trace bit set, i.e., had the control message not had a zero-length. In general, DMA operations initiated from host system 126 will have the trace bit set if HIB 114 is in a trace window.

In the implementation of FIG. 2, trace chain 203 receives trace entry data for the component subset that aligns with node 0, while trace chain 205 receives trace entry data for the component subset that aligns with node 1. Each trace chain 203, 205, 207 are distinct data communication paths used by respective nodes 200, 201 and ICI 112 to provide trace entry data to an example trace entry data log 218 of a chip manager 216. Thus, the endpoint of trace chains 203, 205, 207 is chip manager 216 where trace events can be stored in example memory units.

In some implementations, at least one memory unit of chip manager 216 can be 128-bit wide and can have a memory depth of at least 20,000 trace entries. In alternative implementations, at least one memory unit can have a larger or smaller bit-width and can have a memory depth capable of storing more or fewer entries.

In some implementations, chip manager 216 can include at least one processing device executing instructions to manage received trace entry data. For example, chip manager 216 can execute instructions to scan/analyze time stamp data for respective hardware events of trace data received via trace chains 203, 205, 207. Based on the analysis, chip manager 216 can populate trace entry log 218 to include data that can be used to identify (or generate) a time-ordered sequence of hardware trace events. The hardware trace events can correspond to movement of data packets occurring at the component and sub-component level when processing units of system 100 execute an example distributed software program.

In some implementations, hardware units of system 100 may generate trace entries (and corresponding timestamps) that populate an example hardware trace buffer in a non-time-ordered manner (i.e., out-of-order). For example, chip manager 216 can cause multiple trace entries, having generated time-stamps, to be inserted into entry log 218. Respective trace entries, of the multiple inserted trace entries, may not be time-ordered relative to one another. In this implementation, non-time-ordered trace entries can be received by an example host buffer of host system 126. Upon receipt by the host buffer, host system 126 can execute instructions relating to performance analysis/monitoring software to scan/analyze time stamp data for the respective trace entries. The executed instructions can be used to sort the trace entries and to construct/generate a timeline of hardware trace events.

In some implementations, trace entries can be removed from entry log 218 during a tracing session via a host DMA operation. In some instances, host system 126 may not DMA entries out of trace entry log 218 as quickly as they are added to the log. In other implementations, entry log 218 can include a predefined memory depth. If the memory depth limit of entry log 218 is reached, additional trace entries may be lost. In order to control which trace entries are lost, entry log 218 can operate in first-in-first-out (FIFO) mode, or, alternatively, in an overwrite recording mode.

In some implementations, the overwrite recording mode can be used, by system 100, to support performance analysis associated with post-mortem debugging. For example, program code can be executed for a certain time-period with tracing activity enabled and overwrite recording mode enabled. In response to a post-mortem software event (e.g., a program crash) within system 100, monitoring software executed by host system 126 can analyze the data contents of an example hardware trace buffer to gain insight into hardware events that occurred before the program crash. As used in this specification, post-mortem debugging relates to analysis or debugging of program code after the code has crashed or has generally failed to execute/operate as intended.

In FIFO mode, if entry log 218 is full, and if host system 126 does remove saved log entries within a certain timeframe, to conserve memory resources, new trace entries may not be saved to a memory unit of chip manager 216. While in the overwrite recording mode, if entry log 218 is full because host system 126 does remove saved log entries within a certain timeframe, to conserve memory resources new trace entries can overwrite the oldest trace entry stored within entry log 218. In some implementations, trace entries are moved to a memory of host system 126 in response to a DMA operation using processing features of HIB 114.

As used in this specification, a trace point is the generator of a trace entry and data associated with the trace entry received by chip manager 216 and stored in trace entry log 218. In some implementations, a multi-core multi-node processor microchip can include three trace chains within the chip such that a first trace chain receives trace entries from a chip node 0, a second trace chain receives trace entries from a chip node 1, and a third trace chain receives trace entries from an ICI router of the chip.

Each trace point has a unique trace identification number, within its trace chain, that it inserts into the header of the trace entry. In some implementations, each trace entry identifies the trace chain it originated from in a header indicated by one or more bytes/bits of the data word. For example, each trace entry can include a data structure having defined field formats (e.g., header, payload, etc.) that convey information about a particular trace event. Each field in a trace entry corresponds to useful data applicable to the trace point that generated the trace entry.

As indicated above, each trace entry can be written to, or stored within, a memory unit of chip manager 216 associated with trace entry log 218. In some implementations, trace points can be enabled or disabled individually and multiple trace points can generate the same type of trace entry although with different trace point identifiers.

In some implementations, each trace entry type can include a trace name, trace description, and a header that identifies encodings for particular fields and/or a collection of fields within the trace entry. The name, description, and header collectively provide a description of what the trace entry represents. From the perspective of chip manager 216, this description can also identify the particular trace chain 203, 205, 207 that a specific trace entry came in on within a particular processor chip. Thus, fields within a trace entry represent pieces of data (e.g., in bytes/bits) relevant to the description and can be a trace entry identifier used to determine which trace point generated a particular trace entry.

In some implementations, trace entry data associated with one or more of the stored hardware events can correspond, in part, to data communications that occur: a) between at least a node 0 and node 1; b) between at least components within node 0; and c) between at least components within node 1. For example, stored hardware events can correspond, in part, to data communications that occur between at least one of: 1) FPC 104 of node 0 and FPC 104 of node 1; FPC 104 of node 0 and SPC 106 of node 0; 2) SPC 106 of node 1 and SPC 106 of node 1.

Figure 3:
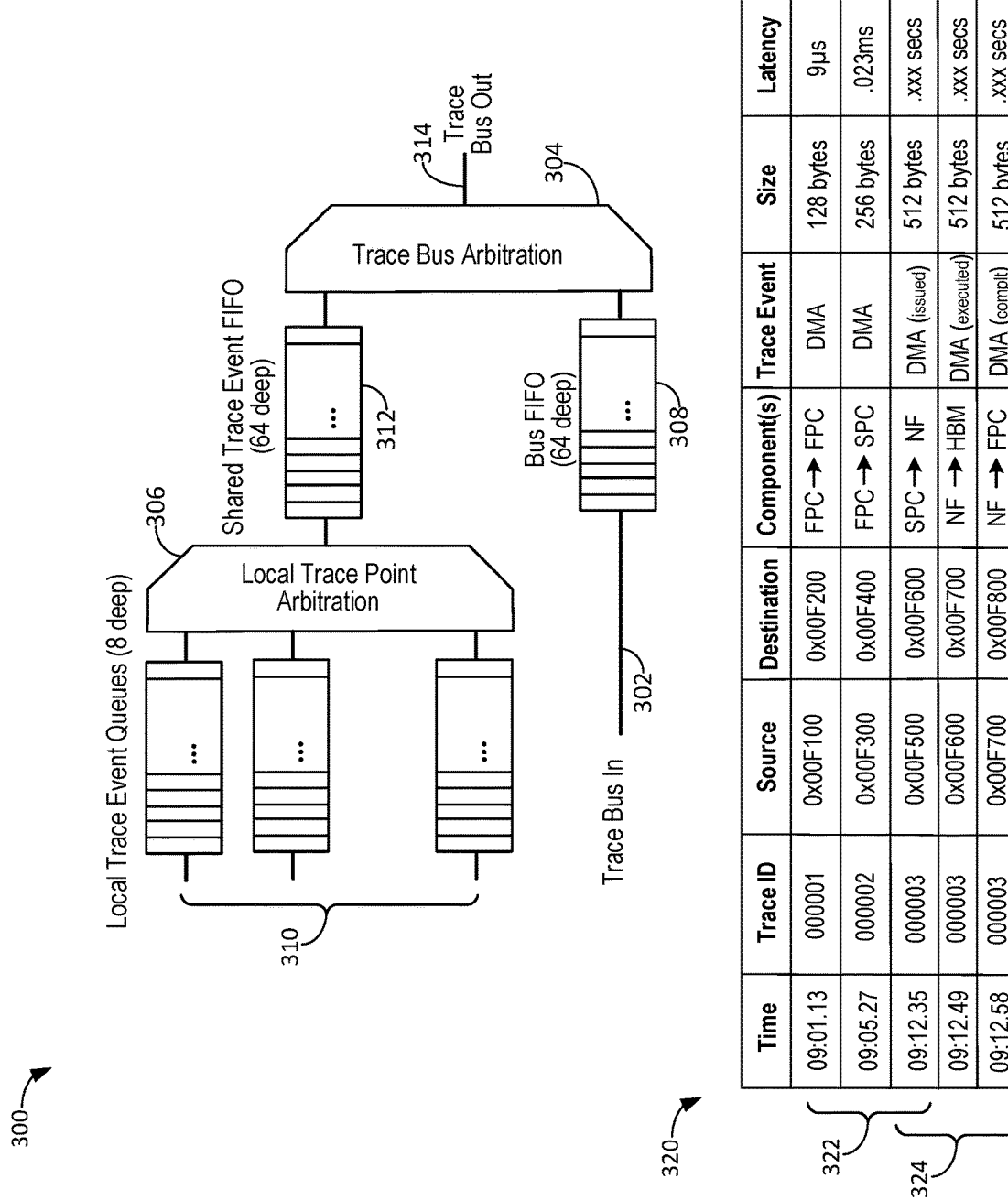
FIG. 3 illustrates a block diagram of an example trace mux design architecture and an example data structure.

FIG. 3 illustrates a block diagram of an example trace mux design architecture 300 and an example data structure 320. Trace mux design 300 generally includes a trace bus input 302, a bus arbiter 304, and a local trace point arbiter 306, a bus FIFO 308, at least one local trace event queue 310, a shared trace event FIFO 312, and a trace bus out 314.

Mux design 300 corresponds to an example trace mux disposed within a component of system 100. Mux design 300 can include the following functionality. Bus in 302 can relate to local trace point data that is temporarily stored within bus FIFO 308 until such that time arbitration logic (e.g., arbiter 304) can cause the trace data to be placed unto an example trace chain. One or more trace points for a component can insert trace event data into at least one local trace event queue 310. Arbiter 306 provides first level arbitration and enables selection of events from among the local trace events stored within queue 310. Selected events are place in shared trace event FIFO 312 which also functions as a storage queue.

Arbiter 304 provides second level arbitration that receives local trace events from FIFO queue 312 and merges the local trace events onto a particular trace chain 203, 205, 207 via trace bus out 314. In some implementations, trace entries may be pushed into local queues 310 faster than they can be merged to shared FIFO 312, or, alternatively, trace entries may be pushed into shared FIFO 312 faster than they can be merged onto trace bus 314. When these scenarios occur, the respective queues 310 and 312 will become full with trace data.

In some implementations, when either queue 310 or 312 becomes full with trace data, system 100 can be configured so that the newest trace entries are dropped and not stored to, or merged to, a particular queue. In other implementations, rather than dropping trace entries when certain queues fill up (e.g., queues 310, 312), system 100 can be configured to stall an example processing pipeline until queues that are filled once again have available queue space to receive entries.

For example, a processing pipeline that uses queues 310, 312 can be stalled until a sufficient, or threshold, number of trace entries are merged onto trace bus 314. The sufficient or threshold number can correspond to a particular number merged trace entries that result in available queue space for one or more trace entries to be received by queues 310, 312. Implementations in which processing pipelines are stalled, until downstream queue space becomes available, can provide higher-fidelity trace data based on certain trace entries being retained rather than dropped.

In some implementations, local trace queues are as wide as required by the trace entry, such that each trace entry takes only one spot in local queue 310. However, shared trace FIFO queue 312 can use a unique trace entry line encoding such that some trace entries can occupy two locations in shared queue 312. In some implementations, when any data of a trace packet is dropped, the full packet is dropped so that no partial packets appear in trace entry log 218.

In general, a trace is a timeline of activities or hardware events associated with a particular component of system 100. Unlike performance counters (described below), which are aggregate data, traces contain detailed event data that provide insight into hardware activity occurring during a specified trace window. The described hardware system enables extensive support for distributed hardware tracing, including generation of trace entries, temporary storage of trace entries in hardware managed buffer, static and dynamic enabling of one or more trace types, and streaming of trace entry data to host system 126.

In some implementations, traces can be generated for hardware events executed by components of system 100, such as, generating a DMA operation, executing a DMA operation, issuing/execution of certain instructions, or updating sync flags. In some instances, tracing activity can be used to track DMAs through the system, or to track instructions executing on a particular processor core.

System 100 can be configured to generate at least one data structure 320 that identifies one or more hardware events 322, 324 from a timeline of hardware events. In some implementations, data structure 320 arranges one or more hardware events 322, 324 in a time ordered sequence of events that are associated with at least FPC 104 and SPC 106. In some instances, system 100 can store data structure 320 in a memory bank of a host control device of host system 126. Data structure 320 can be used to assess performance of program code executed by at least processor cores 104 and 106.

As shown by hardware events 324, in some implementations, a particular trace identification (ID) number (e.g., trace ID '003) can be associated with multiple hardware events that occur across the distributed processor units. The multiple hardware events can correspond to a particular memory access operation (e.g., a DMA), and the particular trace ID number is used to correlate one or more hardware events.

For example, as indicated by event 324, a single trace ID for a DMA operation can include multiple time steps corresponding to multiple different points in the DMA. In some instances, trace ID '003 can have an "issued" event, an "executed" event, and a "completed" event that are identified as being some time apart relative to each other. Hence, in this regard, the trace ID can be further used for determining a latency attribute of the memory access operation based on the correlation and with reference to the time steps.

In some implementations, generating data structure 320 can include, for example, system 100 comparing event time stamps of respective events in a first subset of hardware events with event time stamps of respective events in a second subset of hardware events. Generating data structure 320 can further include, system 100 providing, for presentation in the data structure, a correlated set of hardware events based, in part, on the comparison between the first subset of events and the second subset of events.

As shown in FIG. 3, data structure 320 can identify at least one parameter that indicates a latency attribute of a particular hardware event 322, 324. The latency attribute can indicate at least a duration of the particular hardware event.

In some implementations, data structure 320 is generated by software instructions executed by a control device of host system 126. In some instances, structure 320 can be generated responsive to the control device storing trace entry data to a memory disk/unit of host system 126.

Figure 4:
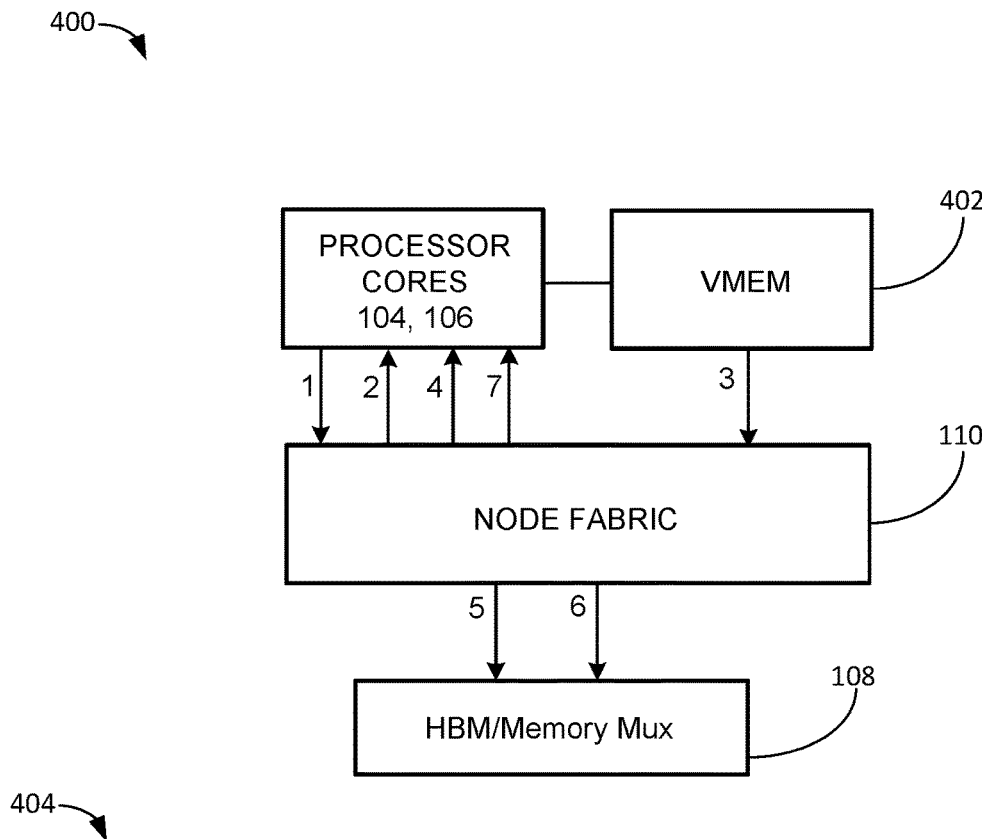
FIG. 4 is a block diagram indicating trace activity for a direct memory access trace event executed by an example computing system for distributed hardware tracing.

FIG. 4 is a block diagram 400 indicating example trace activity for a direct memory access (DMA) trace event executed by system 100. For DMA tracing, data for an example DMA operation originating from a first processor node to a second processor node can travel via ICI 112 and can generate intermediate ICI/router hops along the data path. The DMA operation will generate trace entries at each node within a processor chip, and along each hop, as the DMA operation traverses ICI 112. Information is captured by each of these generated trace entries to reconstruct a temporal progression of the DMA operations along the nodes and hops.

An example DMA operation can be associated with the process steps depicted in the implementation of FIG. 4. For this operation, a local DMA transfers data from a virtual memory 402 (vmem 402) associated with at least one of processor cores 104, 106 to HBM 108. The numbering depicted in diagram 400 correspond to the steps of table 404 and generally represents activities in node fabric 110 or activities initiated by node fabric 110.

The steps of table 404 generally describe associated trace points. The example operation will generate six trace entries for this DMA. Step one includes the initial DMA request from the processor core to node fabric 110 which generates a trace point in the node fabric. Step two includes a read command in which node fabric 110 asks the processor core to transfer data which generates another trace point in node fabric 110. The example operation does not have a trace entry for step three when vmem 402 completes a read of node fabric 110.

Step four includes node fabric 110 performing a read resource update to cause a sync flag update in the processor core which generates a trace point in the processor core. Step five includes a write command in which node fabric 110 notifies memory mux 108 of the forthcoming data to be written to the HBM. The notification via the write command generates a trace point in node fabric 110, while at step six, completion of the write to HBM also generates a trace point in node fabric 110. At step seven, node fabric 110 performs a write resource update to cause a sync flag update in the processor core which generates a trace point in the processor core (e.g., in FPC 104). In addition to the write resource update, node fabric 110 can perform an acknowledge update ("ack update") where data completion for the DMA operation is signaled back to the processor core. The ack update can generate trace entries that are similar to trace entries generated by the write resource update.

In another example DMA operation, a first trace entry is generated when a DMA instruction is issued in a node fabric 110 of the originating node. Additional trace entries can be generated in node fabric 110 to capture time used to read data for the DMA and writing the data to outgoing queues. In some implementations, node fabric 110 can packetize DMA data into smaller chunks of data. For data packetized into smaller chunks, read and write trace entries can be produced for a first data chunk and a last data chunk. Optionally, in addition to the first and last data chunks, all data chunks can be set to generate trace entries.

For remote/non-local DMA operations that may require ICI hops, the first data and the last data chunk can generate additional trace entries at ingress and egress points in each intermediate hop along ICI/router 112. When DMA data arrives at a destination node, trace entries similar to the previous node fabric 110 entries are generated (e.g., read/write of first and last data chunks) at the destination node. In some implementations, a final step of the DMA operation can include executed instructions associated with the DMA causing an update to a sync flag at the destination node. When the sync flag is updated a trace entry can be generated indicating completion of the DMA operation.

In some implementations, DMA tracing is initiated by FPC 104, SPC 106, or HIB 114 when in each component is in trace mode such that trace points can be executed. Components of system 100 can enter trace mode based on global controls in FPC 104 or SPC 106 via a trigger mechanism. The trace points trigger in response to the occurrence of a specific action or condition associated with execution of program code by the components of system 100. For example, portions of the program code can include embedded trigger functions that are detectable by at least one hardware component of system 100.

The components of system 100 can be configured to detect a trigger function associated with portions of program code executed by at least one of FPC 104 or SPC 106. In some instances, the trigger function can correspond to at least one of: 1) a particular sequence step in a portion or module of the executed program code; or 2) a particular time parameter indicated by the GTC used by the distributed processor units of system 100.

Responsive to detecting the trigger function, a particular component of system 100 can initiate, trigger, or execute at least one trace point (e.g., a trace event) that causes trace entry data associated with one or more hardware events to be stored in at least one memory buffer of the hardware component. As noted above, stored trace data can then be provided to chip manager 216 by way of at least one trace chain 203, 205, 207.

FIG. 5 is a process flow diagram of an example process 500 for distributed hardware tracing using component features of system 100 and the one or more nodes 200, 201 of system 100. Thus, process 500 can be implemented using one or more of the above-mentioned computing resources of systems 100 including nodes 200, 201.

Process 500 begins at block 502 and includes computing system 100 monitoring execution of program code executed by one or more processor components (including at least FPC 104 and SPC 106). In some implementations, execution of program code that generates tracing activities can be monitored, at least in part, by multiple host systems, or subsystems of a single host system. Hence, in these implementations, system 100 can perform multiple processes 500 relating to analysis of tracing activities for hardware events occurring across distributed processing units.

In some implementations, a first processor component is configured to execute at least a first portion of the program code that is monitored. At block 504, process 500 includes computing system 100 monitoring execution of program code executed by a second processor component. In some implementations, the second processor component is configured to execute at least a second portion of the program code that is monitored.

Components of computing system 100 can each include at least one memory buffer. Block 506 of process 500 includes system 100 storing data identifying one or more hardware events in the at least one memory buffer of a particular component. In some implementations, the hardware events occur across distributed processor units that include at least the first processor component and the second processor component. The stored data identifying the hardware events can each include a hardware event time stamp and metadata characterizing the hardware event. In some implementations, a collection of hardware events corresponds to a timeline events.

For example, system 100 can store data identifying one or more hardware events that correspond, in part, to movement of data packets between a source hardware component within system 100 and a destination hardware component within system 100. In some implementations, the stored metadata characterizing the hardware event can correspond to at least one of: 1) a source memory address, 2) a destination memory address, 3) a unique trace identification number relating to a trace entry that causes the hardware event to be stored, or 4) a size parameter associated with a direct memory access (DMA) trace entry.

In some implementations, storing data that identifies a collection of hardware events includes storing event data in a memory buffer of FPC 104 and/or SPC 106 that corresponds, for example, to at least one local trace event queue 310. The stored event data can indicate subsets of hardware event data that can be used to generate a larger timeline of hardware events. In some implementations, storing of event data occurs in response to at least one of FPC 104 or SPC 106 executing hardware trace instructions associated with portions of program code executed by components of system 100.

At block 508 of process 500, system 100 generates a data structure, such as structure 320, that identifies one or more hardware events from the collection of hardware events. The data structure can arrange the one or more hardware events in a time ordered sequence of events that are associated with at least the first processor component and the second processor component. In some implementations, the data structure identifies a hardware event time stamp for a particular trace event, a source address associated with the trace event, or a memory address associated with the trace event.

At block 510 of process 500, system 100 stores the generated data structure in a memory bank of a host device associated with host system 126. In some implementations, the stored data structure can be used by host system 126 to analyze performance of the program code executed by at least the first processor component or the second processor component. Likewise, the stored data structure can be used by host system 126 to analyze performance of at least one component of system 100.

For example, the user, or host system 126, can analyze the data structure to detect or determine if there is a performance issue associated with execution of a particular software module within the program code. An example issue can include the software module not completing execution within an allotted execution time window.

Further, the user, or host device 126, can detect or determine if a particular component of system 100 is operating above or below a threshold performance level. An example issue relating to component performance can include a particular hardware component executing certain events but generating result data that is outside acceptable parameter ranges for result data. In some implementations, the result data may not be consistent with result data generated by other related components of system 100 that execute substantially similar operations.

For example, during execution of the program code, a first component of system 100 can be required to complete an operation and to generate a result. Likewise, a second component of system 100 can be required to complete a substantially similar operation and to generate a substantially similar result. Analysis of the generated data structure can indicate that the second component generated a result that is drastically different than the result generated by the first component. Likewise, the data structure may indicate a result parameter value of the second component that is noticeably outside a range of acceptable result parameters. These results can likely indicate a potential performance issue with the second component of system 100.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively, or in addition, the program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

The processes and logic flows described in this specification can be performed by one or more programmable computers executing one or more computer programs to perform functions by operating on input data and generating output(s). The processes and logic flows can also be performed by, and apparatus can also be implemented as, special purpose logic circuitry, e.g., an FPGA (field programmable gate array), an ASIC (application specific integrated circuit), or a GPGPU (General purpose graphics processing unit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks. The processor and the memory can be supplemented by, or incorporated in, special purpose logic circuitry.

While this specification contains many specific implementation details, these should not be construed as limitations on the scope of any invention or of what may be claimed, but rather as descriptions of features that are specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by a hardware tracing system for capturing data describing hardware events, the method comprising:

detecting, at a multi-core processor comprising a plurality of cores, a trigger that triggers capturing of the data describing the hardware events, wherein the trigger is:
   i) satisfied as a result of executing program code using respective processor components within each of the plurality cores; and
   ii) configured to cause storage of event data about the operations performed at the multi-core processor;

in response to detecting the trigger, storing, at the multi-core processor, event data describing trace activity, wherein the event data is captured and stored during execution of the program code at the multi-core processor and is specific to operations involving:
   i) a transfer of data between respective processor components within at least one core of the plurality of cores; and
   ii) a transfer of data between respective cores of the multi-core processor; and providing, to host software, the event data that is stored in response to detecting the trigger, wherein the event data provided to the host software represents a timeline of operations and enables analyzing performance of the program code using the host software.

2. The method of claim 1, wherein the trigger is encoded as an embedded operand in the program code using a parameter value that defines a step in a computing operation of the program code.

3. The method of claim 1, wherein storing event data in response to detecting the trigger comprises:
   storing event data at respective performance counters of the multi-core processor, wherein event data stored at the respective performance counters comprises incremental parameter counts describing trace activity for a particular operation.

4. The method of claim 1, comprising:
generating multiple respective trace points at the multi-core processor during the transfer of data between the respective processor components, wherein a subset of the trace points is generated at one or more of the respective cores of the multi-core processor.

5. The method of claim 4, wherein trace points at a first core of the multi-core processor are used to store event data for a processor component of the first core based on a trace bit that controls tracing activity of the processor component.

6. The method of claim 5, comprising:
detecting that an instruction for an operation includes the trace bit for controlling tracing activity of the processor component of the first core;
determining whether the trace bit is set to a value that enables tracing activity of the processor component of the first core; and
in response to determining that the trace bit is set to a value that enables tracing activity, storing event data at a performance counter of the first core for a trace point generated at the multi-core processor.

7. The method of claim 4, wherein storing the event data occurs based on operations in which data being transferred traverses a plurality of intermediate locations along a data path that:
communicably couples the respective cores of the multi-core processor; or
communicably couples respective multi-core processors of the hardware tracing system.

8. The method of claim 7, wherein each of the plurality of intermediate locations corresponds to one or more trace points that are managed by a trace mux of a respective core of the multi-core processor.

9. The method of claim 1, wherein operations involving the transfer of data include memory access operations comprising:
accessing data stored at a first core of the multi-core processor; and
transferring, using an inter-chip interconnect of the hardware tracing system, the data for storage at a second, different core of the multi-core processor or for storage at another multi-core processor.

10. The method of claim 1, wherein providing the event data to the host software comprises:
providing the event data to host software that runs on a host controller of the hardware tracing system, and the event data is provided for analysis by the host controller to debug a hardware issue that occurs during execution of the program code.

11. A hardware tracing system for capturing data describing hardware events, the hardware tracing system comprising:
one or more processing devices; and
one or more non-transitory machine-readable storage devices for storing instructions that are executable by the one or more processing devices to cause performance of operations comprising:
detecting, at a multi-core processor comprising a plurality of cores, a trigger that triggers capturing of the data describing the hardware events, wherein the trigger is:
i) satisfied as a result of executing program code using respective processor components within each of the plurality cores; and
ii) configured to cause storage of event data about the operations performed at the multi-core processor;
in response to detecting the trigger, storing, at the multi-core processor, event data describing trace activity, wherein the event data is captured and stored during execution of the program code at the multi-core processor and is specific to operations involving:
i) a transfer of data between respective processor components within at least one core of the plurality of cores; and
ii) a transfer of data between respective cores of the multi-core processor; and
providing, to host software, the event data that is stored in response to detecting the trigger, wherein the event data provided to the host software represents a timeline of operations and enables analyzing performance of the program code using the host software.

12. The hardware tracing system of claim 11, wherein the trigger is encoded as an embedded operand in the program code using a parameter value that defines a step in a computing operation of the program code.

13. The hardware tracing system of claim 11, wherein storing event data in response to detecting the trigger comprises:
storing event data at respective performance counters of the multi-core processor, wherein event data stored at the respective performance counters comprises incremental parameter counts describing trace activity for a particular operation.

14. The hardware tracing system of claim 11, wherein the operations comprise:
generating multiple respective trace points at the multi-core processor during the transfer of data between the respective processor components, wherein a subset of the trace points is generated at one or more of the respective cores of the multi-core processor.

15. The hardware tracing system of claim 14, wherein trace points at a first core of the multi-core processor are used to store event data for a processor component of the first core based on a trace bit that controls tracing activity of the processor component.

16. The hardware tracing system of claim 15, wherein the operations comprise:
detecting that an instruction for an operation includes the trace bit for controlling tracing activity of the processor component of the first core;
determining whether the trace bit is set to a value that enables tracing activity of the processor component of the first core; and
in response to determining that the trace bit is set to a value that enables tracing activity, storing event data at a performance counter of the first core for a trace point generated at the multi-core processor.

17. The hardware tracing system of claim 16, wherein storing the event data occurs based on operations in which data being transferred traverses a plurality of intermediate locations along a data path that:
communicably couples the respective cores of the multi-core processor; or
communicably couples respective multi-core processors of the hardware tracing system.

18. The hardware tracing system of claim 11, wherein operations involving the transfer of data include memory access operations comprising:
accessing data stored at a first core of the multi-core processor; and transferring, using an inter-chip interconnect of the hardware tracing system, the data for storage at a second, different core of the multi-core processor or for storage at another multi-core processor.

19. The hardware tracing system of claim 11, wherein providing the event data to the host software comprises:

providing the event data to host software that runs on a host controller of the hardware tracing system, and the event data is provided for analysis by the host controller to debug a hardware issue that occurs during execution of the program code.

20. One or more non-transitory machine-readable storage devices for storing instructions used to capture data describing hardware events, the instructions being executable by one or more processing devices to cause performance of operations comprising:

detecting, at a multi-core processor comprising a plurality of cores, a trigger that triggers capturing of the data describing the hardware events, wherein the trigger is:

i) satisfied as a result of executing program code using respective processor components within each of the plurality cores; and
ii) configured to cause storage of event data about the operations performed at the multi-core processor;

in response to detecting the trigger, storing, at the multi-core processor, event data describing trace activity, wherein the event data is captured and stored during execution of the program code at the multi-core processor and is specific to operations involving:
i) a transfer of data between respective processor components within at least one core of the plurality of cores; and
ii) a transfer of data between respective cores of the multi-core processor; and providing, to host software, the event data that is stored in response to detecting the trigger, wherein the event data provided to the host software represents a timeline of operations and enables analyzing performance of the program code using the host software.

* * * * *